United States Patent
Hama et al.

(10) Patent No.: US 7,425,072 B2
(45) Date of Patent: Sep. 16, 2008

(54) METHOD AND APPARATUS FOR DISPLAYING 3-D IMAGE

(75) Inventors: Yoshihiro Hama, Saitama (JP); Mikio Horie, Saitama (JP)

(73) Assignee: Hoya Corporation, Tokyo (JP)

( * ) Notice: Subject to any disclaimer, the term of this patent is extended or adjusted under 35 U.S.C. 154(b) by 320 days.

(21) Appl. No.: 11/286,359

(22) Filed: Nov. 25, 2005

(65) Prior Publication Data

US 2006/0109431 A1    May 25, 2006

(30) Foreign Application Priority Data

Nov. 25, 2004  (JP)  ............... P2004-339870

(51) Int. Cl.
G03B 21/28 (2006.01)
G02B 27/22 (2006.01)

(52) U.S. Cl. ............ 353/10; 359/478; 359/446

(58) Field of Classification Search ........ 353/7–10; 359/478, 479, 466–469, 477, 446; 348/44, 348/51–60
See application file for complete search history.

(56) References Cited

U.S. PATENT DOCUMENTS

| | | | | |
|---|---|---|---|---|
| 3,324,760 A | * | 6/1967 | Collender | 353/10 |
| 5,754,147 A | * | 5/1998 | Tsao et al. | 345/6 |
| 5,937,117 A | | 8/1999 | Ishida et al. | 385/24 |
| 6,183,088 B1 | * | 2/2001 | LoRe et al. | 353/7 |
| 6,302,542 B1 | * | 10/2001 | Tsao | 353/7 |
| 6,791,289 B1 | * | 9/2004 | Long et al. | 318/444 |
| 2003/0222869 A1 | * | 12/2003 | Yoshino | 345/419 |
| 2004/0150792 A1 | * | 8/2004 | Satoh et al. | 353/7 |
| 2005/0062684 A1 | * | 3/2005 | Geng | 345/32 |

FOREIGN PATENT DOCUMENTS

| | | |
|---|---|---|
| JP | 9-091468 | 4/1997 |
| JP | 11-223822 | 8/1999 |
| JP | 2000-032415 | 1/2000 |
| JP | 2000-078616 | 3/2000 |
| JP | 2001-054144 | 2/2001 |
| JP | 3479631 | 10/2003 |

OTHER PUBLICATIONS

English Language Abstract of JP 9-091468.
English Language Abstract of JP 11-223822.
English Language Abstract of JP 2000-032415.
English Language Abstract of JP 2000-078616.
English Language Abstract of JP 2001-054144.

* cited by examiner

Primary Examiner—Andrew T Sever
(74) Attorney, Agent, or Firm—Greenblum & Bernstein, P.L.C.

(57) ABSTRACT

An apparatus for displaying a 3-D image has a projector, and a projection controller. The projector has a projection optical system, and projects a series of 2-D images on different projected-positions in a depth direction, in order, by using light passing through the projection optical system. Each 2-D image is formed on the basis of section-views of a 3-D object in the depth-direction. The projector repeatedly and successively projects the series of 2-D images so as to cause an afterimage-effect. In the present invention, the projection controller adjusts a projection-timing of the series of 2-D images, and controls the projection optical system in accordance with the projection-timing so as to focus each 2-D image and maintain a magnification of the series of 2-D images constant.

13 Claims, 13 Drawing Sheets

FIG. 6
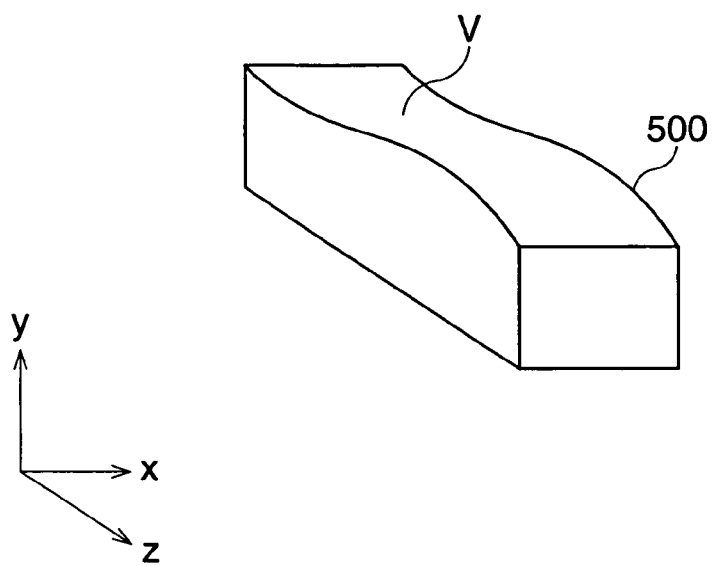
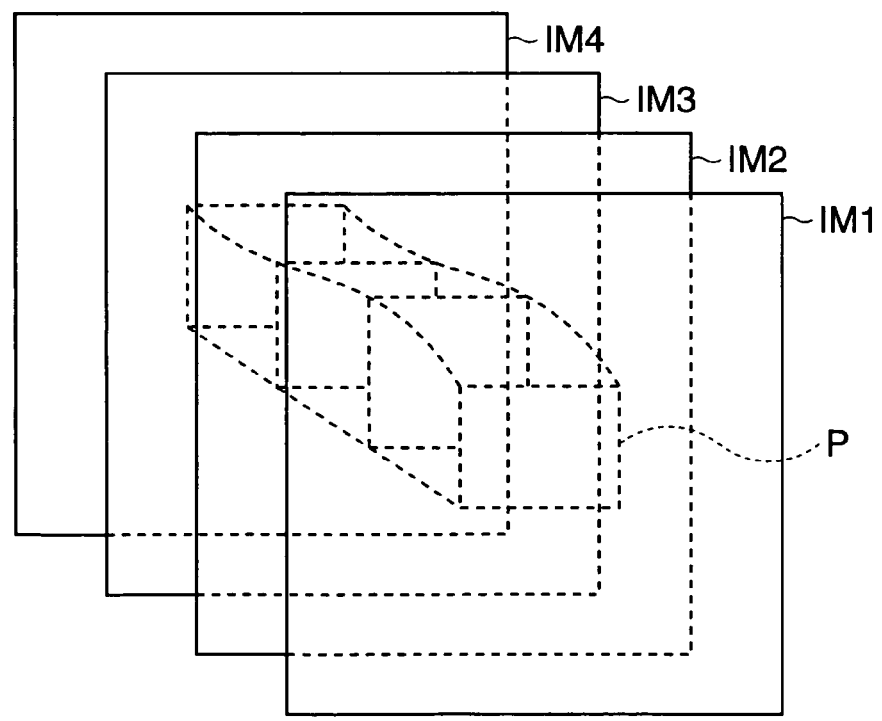

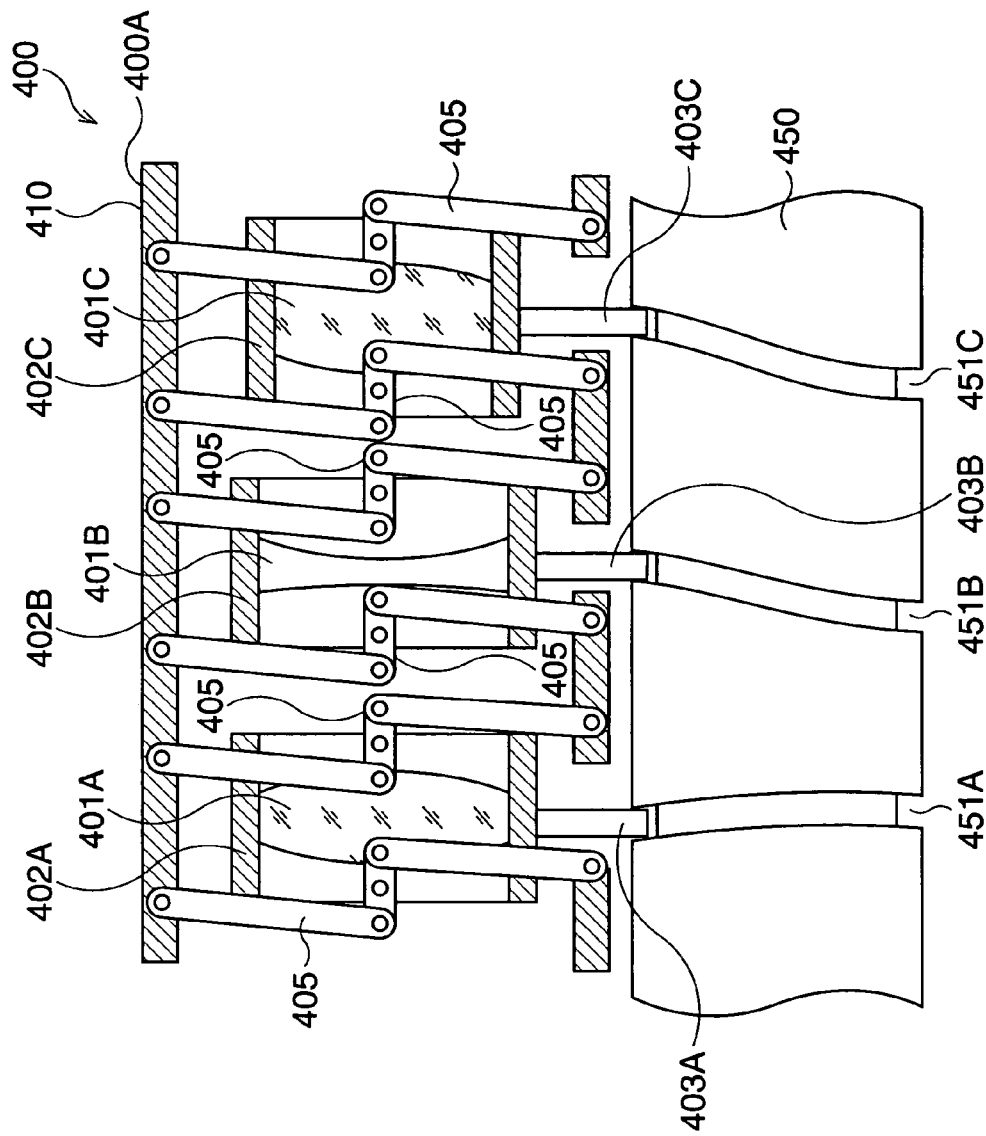

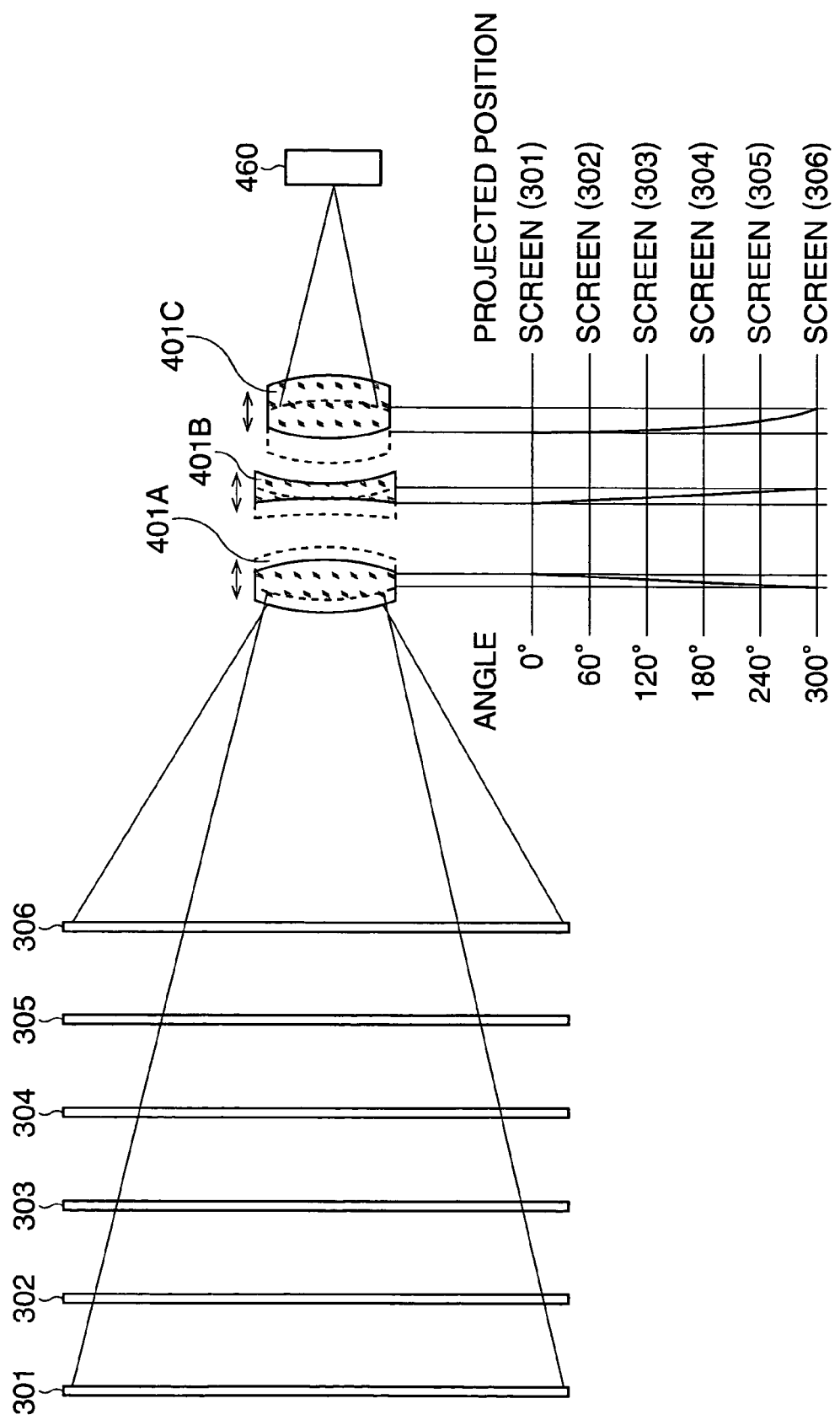

METHOD AND APPARATUS FOR DISPLAYING 3-D IMAGE

BACKGROUND OF THE INVENTION

1. Field of the Invention

The present invention relates to a 3-D (three-dimension) display that enables an observer to perceive an apparent 3-D object. Especially, it relates to a 3-D display based on a DFD (Depth Fusion Display) method.

2. Description of the Related Art

A 3-D display according to a DFD method is different from stereoscopic image systems utilizing binocular parallax, which uses extra equipment such as polarizing eyepiece or uses a lenticular sheet. In the DFD method, a series of 2-D images, which are composed of section-images of a 3-D object, are successively displayed at different positions in a depth-direction. An observer can perceive an apparent stereoscopic object without utilizing binocular parallax, due to an afterimage of the continuously displayed 2-D images.

SUMMARY OF THE INVENTION

An object of the present invention is to provide a method and apparatus having a simple construction, that enables an observer to perceive an apparent 3-D object.

An apparatus for displaying a 3-D image has a projector, and a projection controller. The projector has a projection optical system, and projects a series of 2-D images at different projected-positions in a depth direction, in order, by using light passing through the projection optical system. Each 2-D image is formed on the basis of section-views of a 3-D object in the depth-direction. The projector repeatedly and successively projects the series of 2-D images so as to cause an afterimage-effect. In the present invention, the projection controller adjusts a projection-timing of the series of 2-D images, and controls the projection optical system in accordance with the projection-timing so as to focus each 2-D image and maintain or keep a constant magnification of the series of 2-D images.

BRIEF DESCRIPTION OF THE DRAWINGS

The present invention will be better understood from the description of the preferred embodiments of the invention set forth below together with the accompanying drawings, in which:

FIG. 6 is a view showing a 3-D object and 2-D image;

FIG. 12 is a view showing an inside of a projection optical system according to the second embodiment; and FIG. 13 is a view showing positions of lenses.

DESCRIPTION OF THE PREFERRED EMBODIMENTS

Hereinafter, the preferred embodiments of the present invention are described with reference to the attached drawings.

Figure 1:
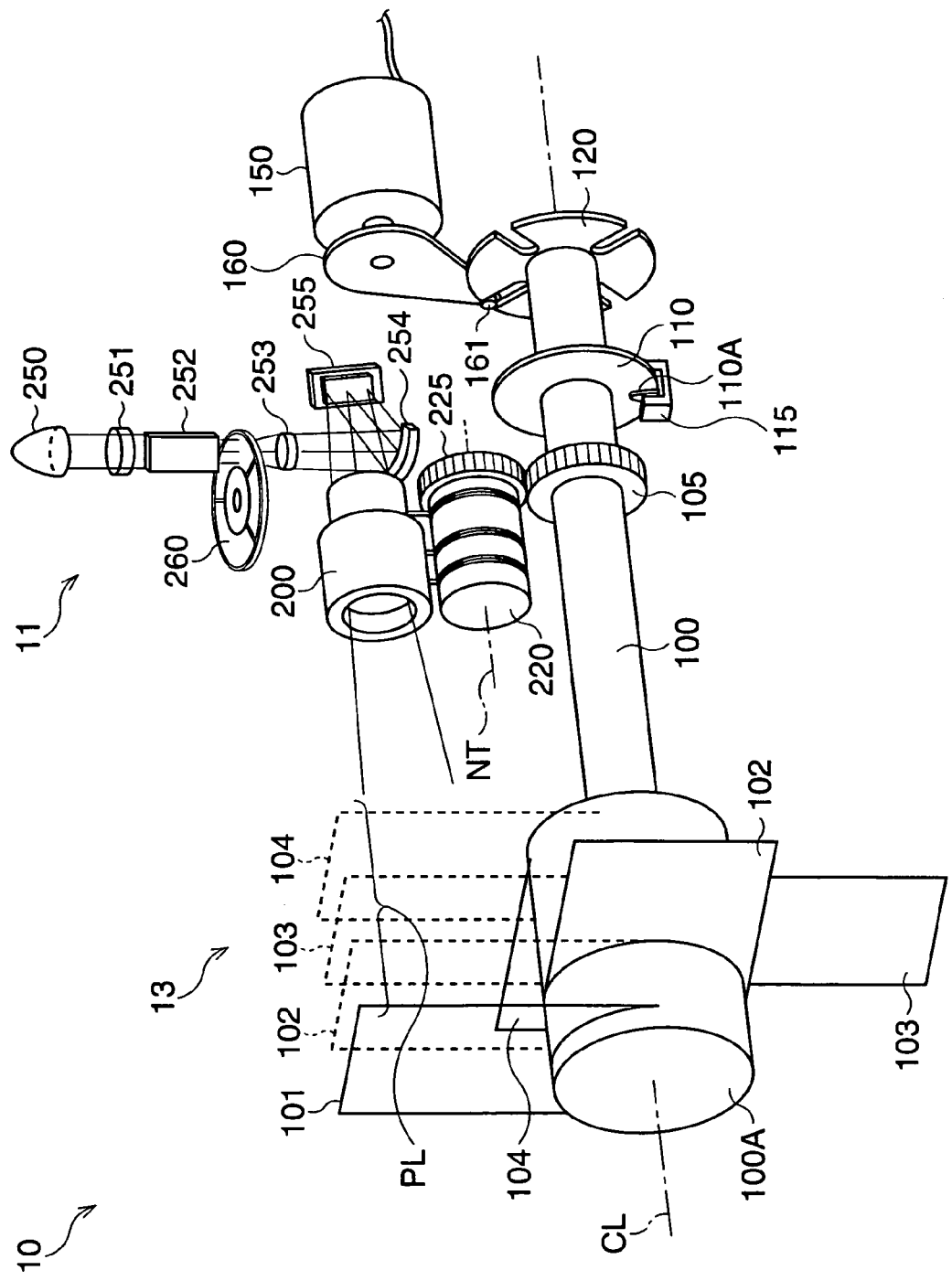
FIG. 1 is a schematic perspective view of a 3-D display according to the first embodiment.

FIG. 1 is a schematic perspective view of a 3-D display according to the first embodiment.

A 3-D display 10 has a projector 11 and a screen driving mechanism 13. A computer system (not shown), which outputs image signals for a 3-D display, is connected to the 3-D display 10. The screen driving mechanism 13 has four rectangular screens 101 to 104, a rotating shaft 100, a geneva wheel 120, and a screen motor 150. The screen driving mechanism 11 has a lamp 250, a color filter 260, a DMD (Digital Micro-mirror Device) 255, and a projection optical system 220.

The screens 101 to 104 are attached to a cylindrical head portion 100A of the rotating shaft 100. The geneva wheel 120 is coaxially attached to the end of the rotating shaft 100, and engages a driving plate 160, which is attached to the screen motor 150. A gearwheel 105 is coaxially and securely attached to the rotating shaft 100 at the rear of the head portion 100A, and a position-detecting wheel 110 with a screen sensor 115 is securely attached to the rotating shaft 100 between the cogwheel 105 and the geneva wheel 120. The projection optical system 200 is attached to a lens camshaft 220, which engages the gearwheel 105 of the rotating shaft 100 via a cogwheel 225.

White color light emitted from the lamp 250 passes through a collecting lens 251 and enters into a integrator lens 252 such as a rod lens, and is emitted as a uniform light. The color filter 260 is composed of Red (R), Green (G), and Blue (B) filter elements, and rotates at a constant speed such that R, G, and B color elements pass through the light-path in order. Light emitted from the rod lens 255 passes through the R, G, B filer elements in sequence so that light corresponding to the color Red, light corresponding to the color Green, and light corresponding to the color Blue are directed to the DMD 255 in order, via a concave mirror 254. The DMD 255 has a plurality of micro-mirrors arranged in a matrix, and each micro-mirror selectively directs incident light to the projection optical system 200 or the outside. The DMD 255 is controlled in accordance with 3-D image data such that a series of 2-D images are successively displayed on the screens 101 to 104. Herein, the series of 2-D images are successively displayed at ⅓₀ time-intervals in accordance with the NTSC standard.

The position-detecting wheel 110 is a disk wheel with a notch 110A, and the screen sensor 115 is a photo-encoder with an LED and a light-receiving sensor, which are opposite to each other on either side of the position-detecting wheel 110. The screen sensor 115 detects one revolution of the rotating shaft 100 by detecting light emitted from the LED through the notch 110A. The DMD 255 and the color filter 260 respectively motion and rotate while synchronizing with the rotation of the rotating shaft 100.

Figure 2A:
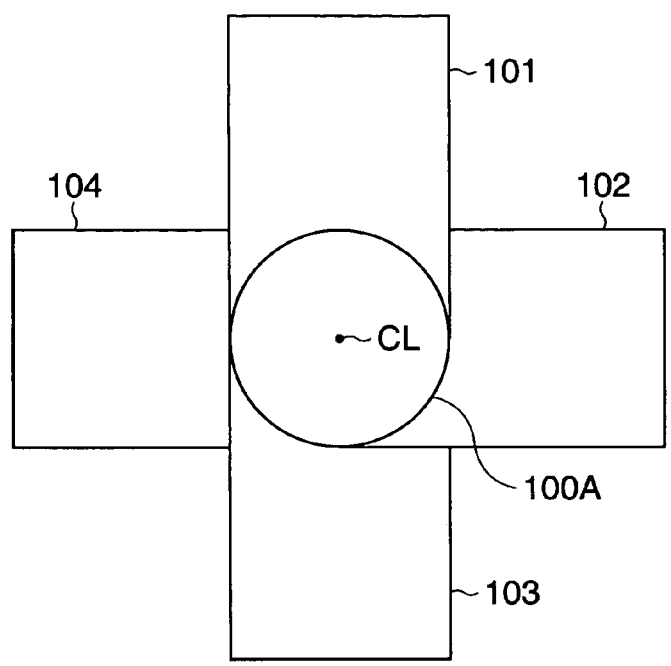
FIG. 2A is a plan view of a screen driving mechanism.
Figure 2B:
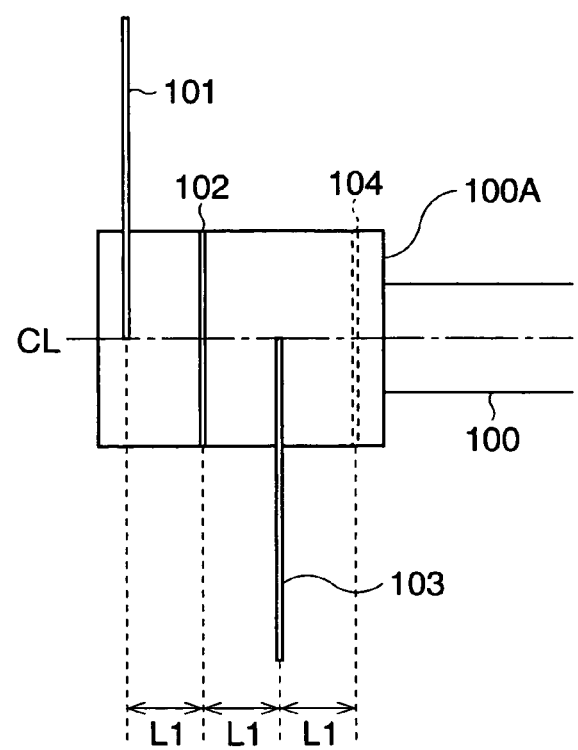
FIG. 2B is a side view of the screen driving mechanism.

FIG. 2A is a plan view of the screen driving mechanism 13, and FIG. 2B is a side view of the screen driving mechanism 13.

As shown in FIG. 1 and FIG. 2B, the screens 101 to 104 are arranged along an axis CL of the rotating shaft 100 at a constant interval "L1" and extend out in different directions with respect to the radial direction. As shown in FIG. 1 and FIG. 2A, a screen and a neighboring screen are at 90 degree angle, namely, two neighboring screens are perpendicular to each other in the circumferential direction. Each of the screens 101 to 104 is perpendicular to the axis CL of the rotating shaft 100.

Figure 3:
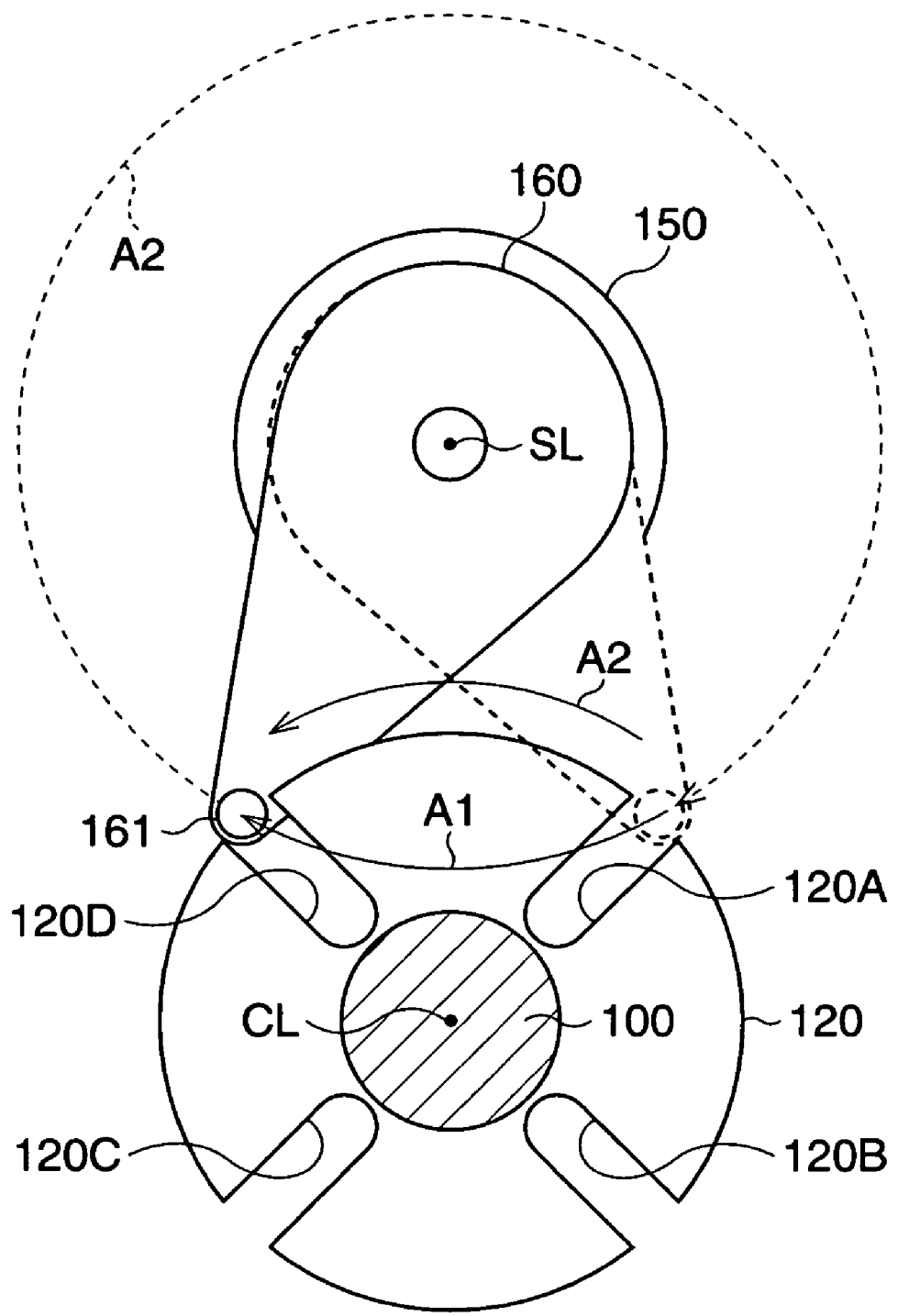
FIG. 3 is a plan view showing a geneva wheel.

FIG. 3 is a plan view showing the geneva wheel 120.

The geneva wheel 120 has four slots 120A to 120D, which extend radially at an interval of 90 degrees. The cone-shaped driving plate 160 is coaxially attached to the screen motor 150, and rotates clockwise around an axis SL in accordance with the rotation of the motor 150. A pin 161 provided at the tip portion of the driving plate 150 contacts the four slot 120A to 120B in order.

The geneva wheel 120 rotates intermittently as the driving plate 160 continuously rotates at a constant speed. When the pin 161 engages with one slot (In FIG. 3, the slot 120A) while the driving plate 160 rotates, the rotating shaft 100 rotates as the driving plate 161 urges the rotating shaft 100 to rotate counterclockwise. The pin 161 maintains the engagement with a given slot until the rotating shaft 100 rotates counterclockwise by 90 degrees.

When the pin 161 moves along arc section "A1" (shown by a solid arrow in FIG. 3), the rotating shaft 100 stops because the pin 161 is apart from the rotating shaft 100. The rotating shaft 100 stops the rotating while the pin 161 moves along an arc "A2" shown by a broken line and engages with a next slot. The geneva wheel 120 is attached to the rotating shaft 100 such that each screen is positioned at a projected-position "PL" shown in FIG. 1. Thus, the screens 101 to 104 are positioned at the projected-position in sequence every time the rotating shaft rotates by 90 degree.

Figure 4:
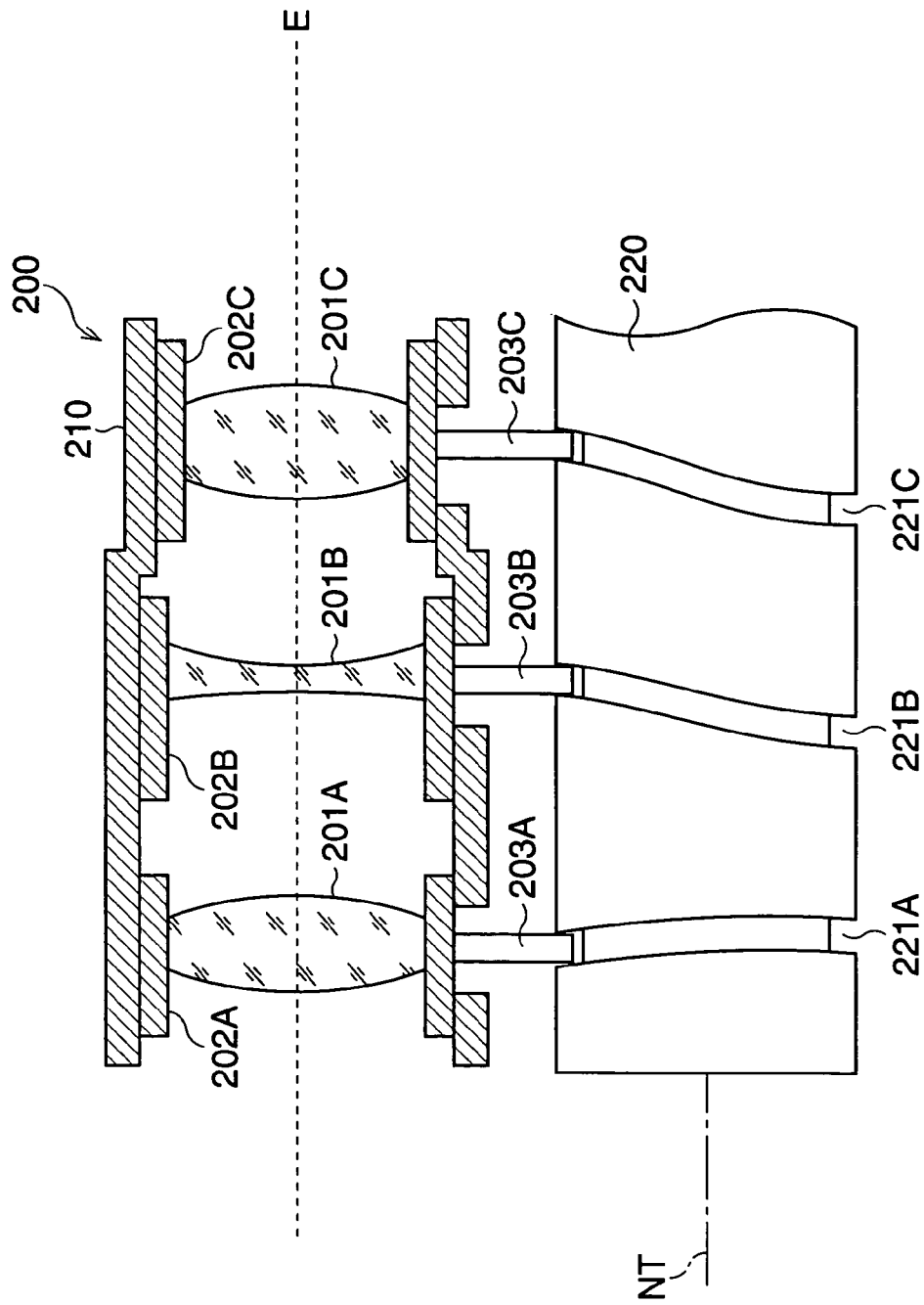
FIG. 4 is a view showing an inside of a projection optical system 200 and a lens camshaft.

FIG. 4 is a view showing an inside of the projection optical system 200 and the lens camshaft 220.

The projection optical system 200 has two convex lenses 201A and 201C and a concave lens 201B in a lens barrel 210, and has a zooming function and a focusing function. The convex lens 201A and 201C are respectively held by a lens frame 202A and a lens frame 202C, whereas the concave lens 201B is held by a lens frame 202B. The lens frames 202A to 202C are respectively attached to cam pins or cam-followers 203A to 203C for shifting the convex and concave lenses 201A to 201C along an optical axis E of the projection optical system 200. The optical axis E is perpendicular to the screens 101 to 104.

The lens camshaft 220 is a cylindrical and cam axis NT is parallel to the optical axis E. The cam-followers 203A to 203B respectively engage with slits 221A to 221C formed on the surface of the lens camshaft 220. The slits 221A to 221C guide the motion of the cam-followers 203A to 203C, and the lenses 201A to 201C respectively shift in accordance with the motion of cam-followers 203A to 203C.

The cogwheel 225 shown in FIG. 1, which is coaxially attached to the lens camshaft 220, rotates in accordance with the rotation of the cogwheel 105 attached to the rotating shaft 100. Therefore, the cogwheel 225 intermittently rotates as the rotating shaft 100 intermittently rotates, and the positions of the lenses 201A to 203A intermittently move as the rotating shaft 100 intermittently rotates.

Figure 5:
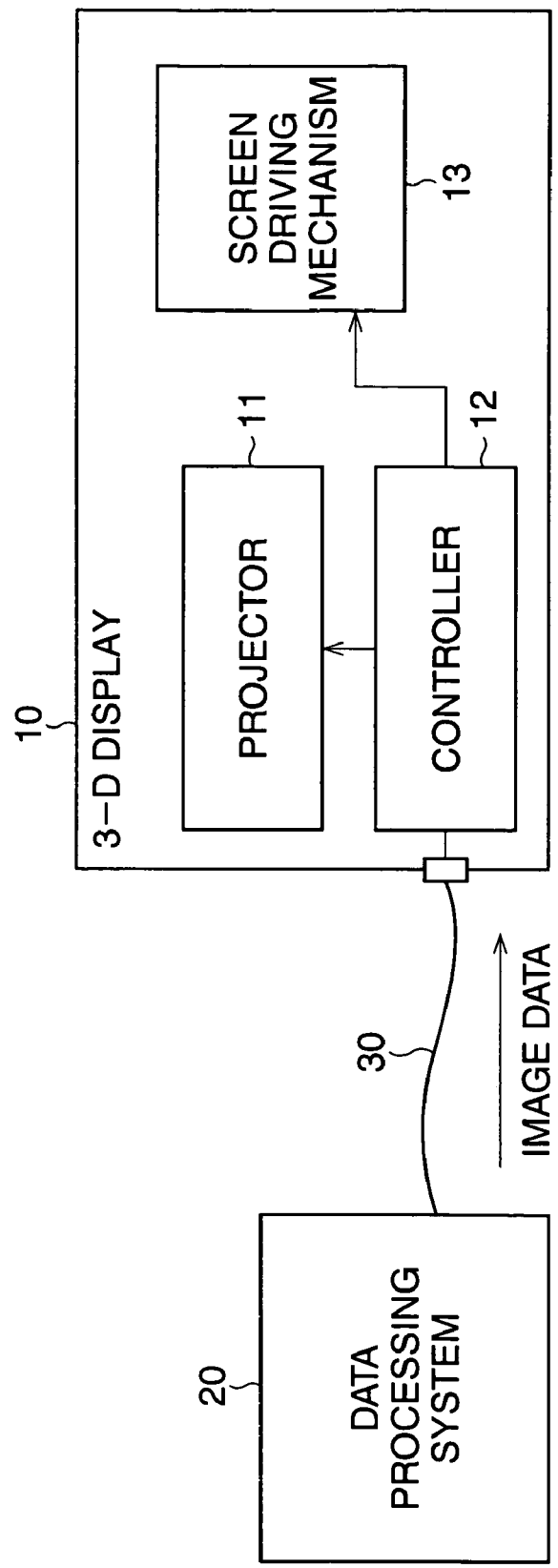
FIG. 5 is a block diagram of the 3-D display 10.

FIG. 5 is a block diagram of the 3-D display 10. The controller 12 in the 3-D display 10 is connected to a data processing system 20 via a cable 30. The data processing system generates 2-D image data on the basis of 3-D image data, which is generated in advance and is stored in a memory (not shown). The controller 12 controls the projector 11 and the screen driving mechanism 13 in accordance with the 2-D image data fed from the data processing system 20.

FIG. 6 is a view showing a 3-D object and 2-D image. The 3-D image data is generated in advance by measuring 3-D information of an object using a well-known method. The 3-D image data includes R, G, and B color data in each voxel "V" on a surface of an object 500. The 3-D image data is herein represented by 3-D coordinates (x, y, z).

In the data processing system 20, a series of 2-D (sampled) image data is generated on the basis of the 3-D image data. The series of 2-D image data is obtained by cutting or dividing the 3-D object 500 along the depth direction (z-direction) at constant gap. Herein, four section (map) images IM1 to IM4 of the 3-D object 500 are defined as 2-D sampled images, which are respectively projected on the screens 101 to 104 in order. Each 2-D sampled image describes a contour or profile of the object 500, and each pixel "P" on the contour, which has R, G, B data of the voxel "V", is represented by 2-D coordinates (x, y). The series of 2-D sampled image data is temporarily stored in a memory (not shown) and are changed to analog R, G, and B image signals. The R, G, B image signals are output to the 3-D display 10 with data associated with the order of display. Herein, The R, G, B image signals corresponding to one frame image are output at 1/30 time intervals in accordance with the NTSC standard.

Figure 7:
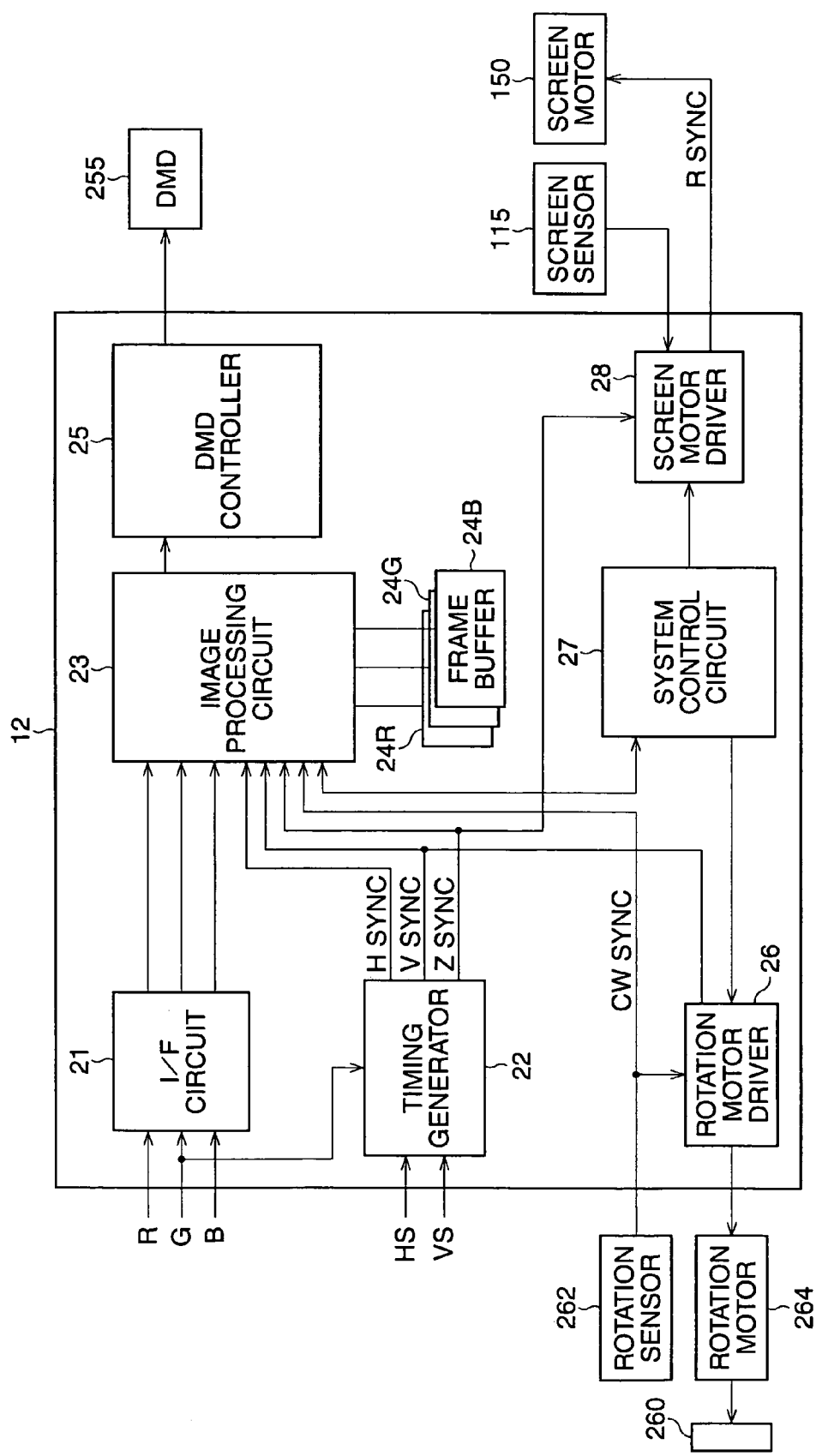
FIG. 7 is a block diagram of the controller.
Figure 8:
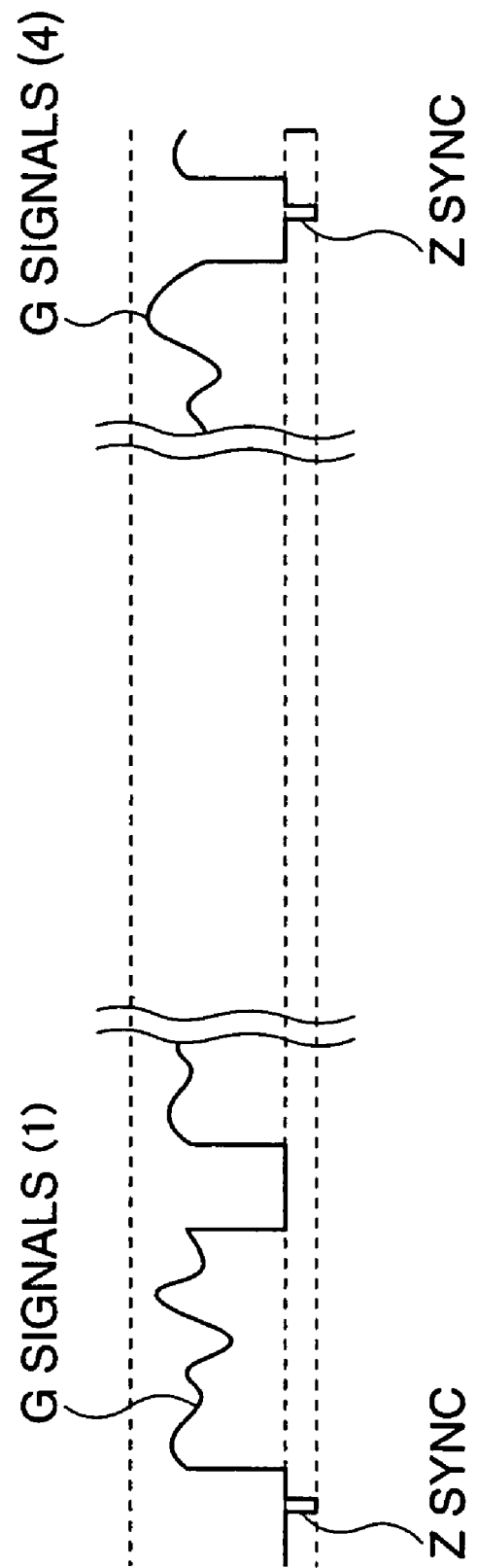
FIG. 8 is a view showing a timing-chart of G image signals.

FIG. 7 is a block diagram of the controller 12. FIG. 8 is a view showing a timing-chart of G image signals.

The 2-D R, G, and B image signals fed from the data processing circuit 20 are input to an I/F circuit 21, wherein the 2-D image signals are digitalized. The digital 2-D image signals are fed to an image processing circuit 23, wherein digital R, G, B image data are temporarily stored in R, G, B frame buffers, and raster data is generated on the basis of the R, G, B image data. A DMD controller 25 controls each micro-mirror on the DMD 255, namely, controls the turning of the micro-mirror's ON/OFF to change the posture or positions of the micro-mirrors.

A timing generator 22 outputs vertical synchronizing signals "VSYNC" and horizontal synchronizing signals "HSYNC", and pulse synchronizing signals "ZSYNC". The image processing circuit 23 outputs the raster data while synchronizing with the vertical synchronizing signals "VSYNC". As shown in FIG. 8, the pulse synchronizing signals "ZSYNC" are included in the G component image signals fed from the data processing system 20. Each pulse signal is interleaved between four G image-signal components, which correspond to the four screens 101 to 104. The timing generator 22 outputs pulse synchronizing signals "ZSYNC" on the basis of the G component image signals.

A rotation motor 264 rotates the disk-like color filter 260 shown in FIG. 1 and a rotation motor driver 26 drives the rotation motor 264. The motor driver 26 controls the rotation of the motor 264 on the basis of rotation detecting signals "CWSYNC", which are fed from the rotation sensor 262, and the vertical synchronizing signals "VSYNC" so as to synchronize the rotation detecting signals "CWSYNC" with the vertical synchronizing signals "VSYNC". The screen motor 150 rotates the driving plate 160 as shown in FIG. 1, and a screen motor driver 28 drives the screen motor 16. The screen motor driver 28 controls the rotation of the screen motor 150 on the basis of the pulse synchronize signals "ZSYNC" and rotation detecting signals "RSYNC", which are fed from the screen sensor 115, so as to synchronizing the rotation detecting signals "RSYNC" with the pulse synchronizing signals "ZSYNC". The system control circuit 27 controls various processes in the 3-D display 10, and sets parameters.

The image processing circuit 23 outputs the raster data in accordance with the pulse synchronizing signals "ZSYNC" and the rotation synchronizing signals "RSYNC". Namely, the image processing circuit 23 outputs the raster data while detecting the position of the screen 101 and the rotational position of the color filter 260.

Figure 9:
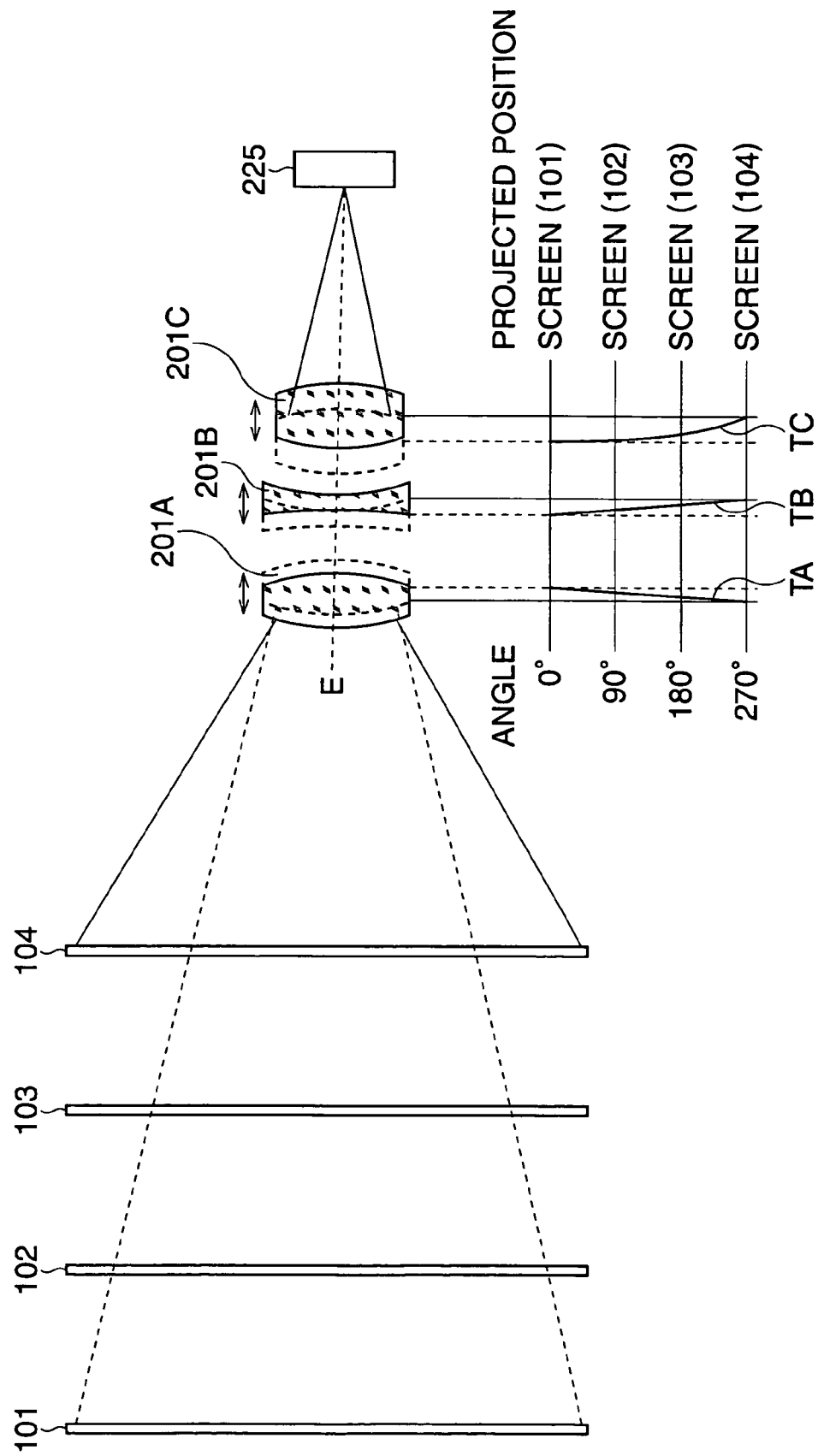
FIG. 9 is a view showing positions of lenses in the projection optical system.

FIG. 9 is a view showing positions of the lenses 201A to 201C in the projection optical system 200.

The lenses 201A to 201C respectively shift along the optical axis E, in accordance with the rotation of the rotating shaft 100. In FIG. 9, the positions of the lenses 201A to 201C at the time that the screens 101 to 104 are positioned at the projected position in order, are represented by curved lines TA, TB, and TC.

The lenses 201A to 201C shift or displace by a predetermined amount along the optical axis every time the rotating shaft 100 rotates by 90 degrees, such that each image projected on a corresponding screen is focused, and the magnification of the projected images is constant. Namely, the series of 2-D images are displayed in a focus and with a constant-magnification by zooming and focusing simultaneously.

With reference to FIGS. 10 to 13, the second embodiment is explained. The second embodiment is different from the first embodiment in the screen driving mechanism. Other constructions are the same as those of the first embodiment.

Figure 10:
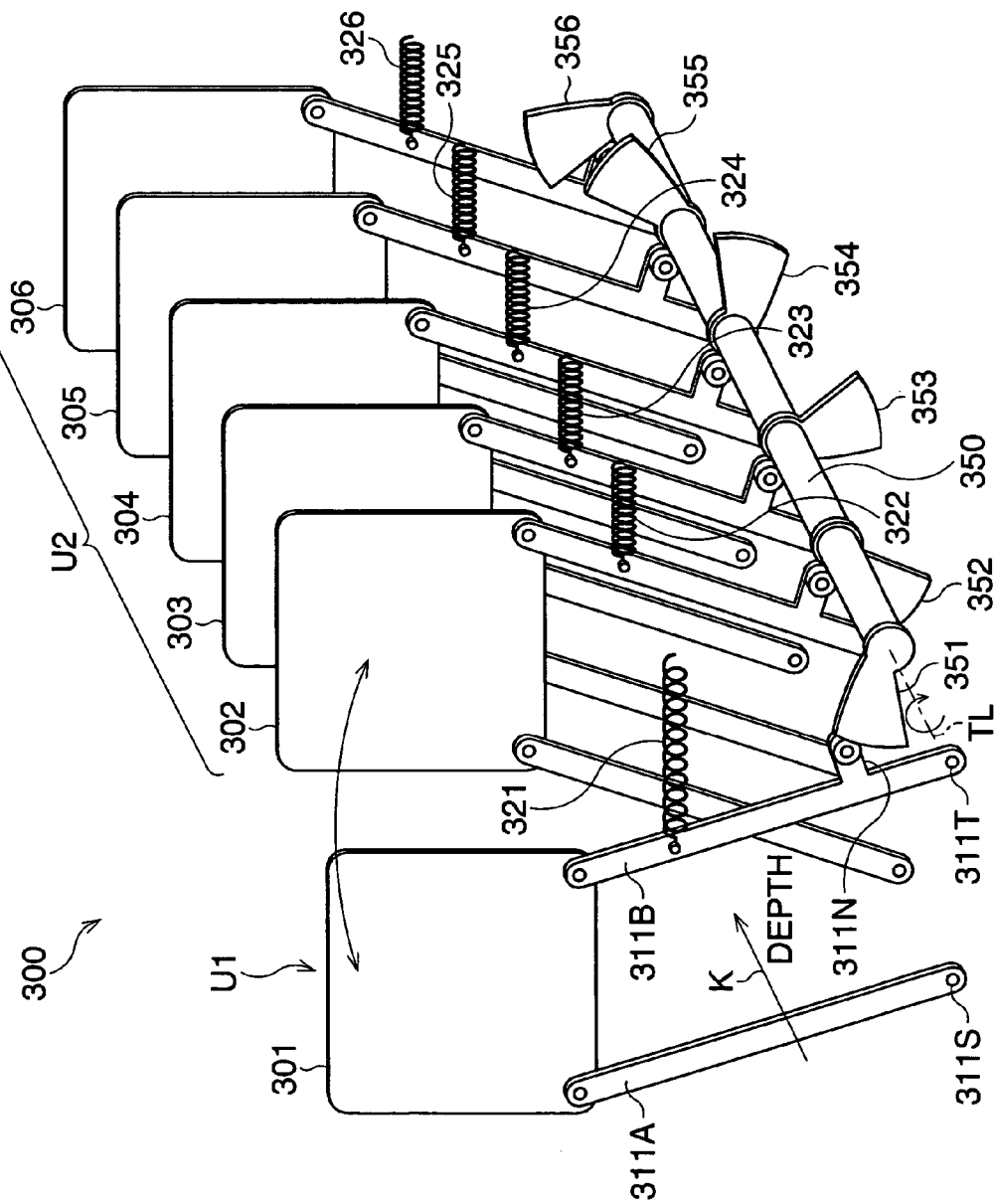
FIG. 10 is a perspective view of a screen driving mechanism according to the second embodiment.
Figure 11:
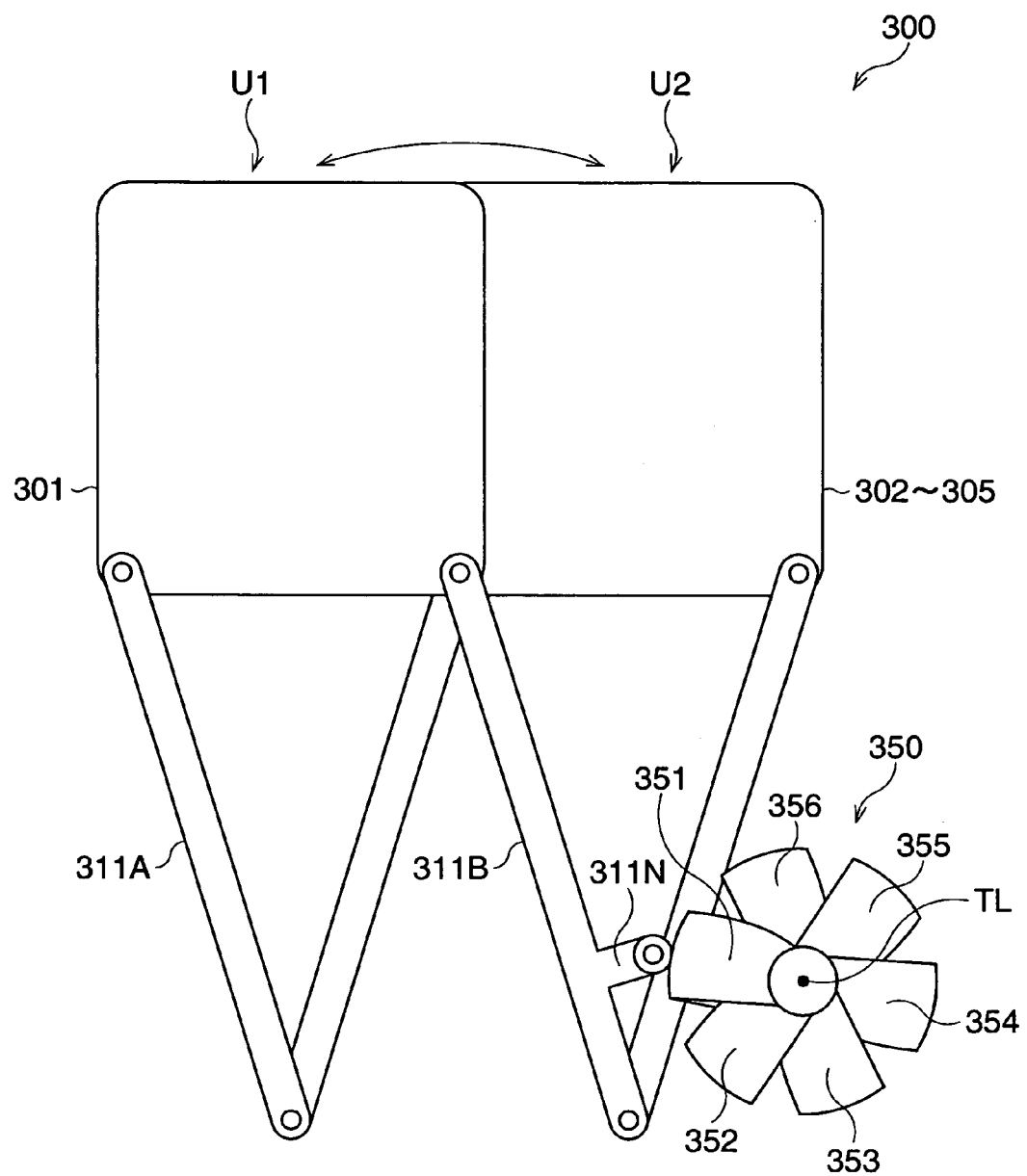
FIG. 11 is a schematic front view of the screen driving mechanism.

FIG. 10 is a perspective view of a screen driving mechanism according to the second embodiment. FIG. 11 is a schematic front view of the screen driving mechanism.

A series of screens 301 to 306 are arranged along a depth direction K in order, and each screen is linked to a pair of rods, which is pivotable along a surface that is perpendicular to the depth direction K, namely, parallel to the screens 301 to 306. A rotating shaft 350 is arranged along the depth direction K and is adjacent to an end portion of the series of pairs of rods. In FIGS. 10 and 11, the pair of rods corresponding to the screen 301 is designated by "311A and 311B". The screens 301 to 306 are operatively connected to the springs 321 to 326 respectively via a corresponding pair of rods, and the screens 301 to 306 are urged toward a side wherein the rotating shaft 350 is arranged.

The rotating shaft 350 has six arc-shaped plates or protrusions 351 to 356, which are helically arranged in the depth direction K in order, at a constant distance. The distance between one plate and the next plate corresponds to a distance between a screen and a next screen. One rod of each pair of rods has an engaging portion, which engages with a corresponding plate. In the case of the screen 301, the rod 311B has an engaging portion 311N, which engages the plate 351.

As shown in FIG. 11, the six plates 351 to 356 are arranged at 60 degrees seen from the rotating axis TL. Therefore, the six plates 351 to 356 respectively engage with corresponding engaging portions in order, while the rotating shaft 100 rotates, so that the screens 301 to 36 are successively urged toward the opposite side of the rotating shaft 300, namely, the projected position U1. Each screen is positioned at the outside position U2 while an opposing plate of the rotating shaft 100 does not engages with a corresponding rod engaging portion. In FIGS. 10 and 11, the screen 301 is positioned at the projected position U1, other screens 102 to 105 are located at the outside position U2.

FIG. 12 is a view showing an inside of a projection optical system according to the second embodiment. FIG. 13 is a view showing the positions of the lenses.

The projection optical system 400 has convex lenses 401A, 401C and a concave lens 401B. The lenses 401A to 401C are respectively held by lens frames 402A to 402C, and the lens frames 402A to 402C are attached to the lens barrel 400A by a straight-line mechanism 405 (watt-link). Similarly to the first embodiment, when the rotating shaft 350 rotates, cam-followers 403A to 403C move along slits 451A to 451C formed on a camshaft 450. A camshaft 450 is operatively attached to the rotating shaft via a timing belt (not shown).

The lenses 401A to 401C shift according to the rotation of the rotating shaft 350 so as to display focused 2-D images having a constant magnification. In FIG. 13, positions of the lenses 401A to 401C are shown by the curved lines MA, MB, and MC.

The projection optical system may be directly attached to the rotating shaft without any camshaft. In this case, cam-slits are formed on the rotating shaft. Another lens shifting mechanism may be used instead of the camshaft.

Gray-scale image signals may be used instead of color image signals. Further, any image signals used for displaying 3-D images may be utilized. The series of 2-D images may be successively and repeatedly projected such that the afterimage-effect occurs. An LCD may be used for projecting the 2-D images instead of the DMD.

The number of screens may be decided optionally. Further, the series of 2-D images may be displayed without screens. For example, virtual images may be displayed by using a suitable optical system.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No. 2004-339870 (filed on Nov. 25, 2004), which is expressly incorporated herein, by reference, in its entirety.

The invention claimed is:

1. An apparatus for displaying a 3-D image comprising:
   a projector that has a projection optical system, and projects a series of 2-D images at different projected-positions in a depth direction, in order, by using light passing through said projection optical system, each 2-D image being formed on a basis of section-views of a 3-D object in said depth-direction;
   a projection controller that adjusts a projection-timing of said series 2-D images, and controls said projection optical system in accordance with said projection-timing so as to focus each 2-D image and maintain a constant magnification of said series of 2-D images; and
   a screen driving mechanism configured to intermittently position a series of screens at said projected-positions in order, said projector projecting each 2-D image on a corresponding screen, said projection controller controlling said screen driving mechanism so as to synchronize positioning of said corresponding screen with said projection-timing,
   wherein said projection controller comprises a camshaft that shifts a position of said projection optical system along an optical axis, in accordance with said projection-timing, said projection controller controlling said camshaft so as to synchronize with said projection-timing, and
   wherein said screen driving mechanism intermittently positions said series of screens by rotating motion, and said camshaft shifts said projection optical system while linking a rotation motion according to said screen driving mechanism, and
   wherein said projector repeatedly and successively projects said series of 2-D images so as to cause an afterimage-effect.

2. The apparatus of claim 1, wherein said projector comprises:
   a light source;

a light modulation unit that has a plurality of two-dimensionally arrayed light modulation elements that selectively direct light to said projection optical system; and a light modulation controller that independently controls each light modulation element to form said series of 2-D images.

3. The apparatus of claim 1, wherein said screen driving mechanism comprises:

a rotating shaft configured to extend along said depth direction, and hold said series of screens so as to provide a predetermined interval between adjacent screens along a circumferential direction; and a geneva wheel configured to intermittently rotate said rotating shaft.

4. The apparatus of claim 3, wherein said camshaft engages with said rotating shaft and shifts positions of said projection optical system along said optical axis as said rotating shaft rotates.

5. The apparatus of claim 1, wherein said screen driving mechanism comprises:

a supporting member configured to hold said series of screens and has a series of engaging portions, a rotating shaft configured to extend along said depth direction, and has a series of engaging protrusions that are arranged helically in said depth direction so as to be opposite to the series of engaging portions so as to provide a predetermined interval between an engaging protrusion and a neighboring engaging protrusion, circumferentially; and an urging member configured to urge each of said series of screens toward the outside of said projected-position via said supporting member, wherein said series of screens is successively and intermittently positioned at said projected-positions as said rotating shaft rotates.

6. The apparatus of claim 5, wherein said camshaft engages said rotating shaft and shifts the position of said projection optical system along said optical axis, as said rotating shaft rotates.

7. The apparatus of claim 1, wherein said camshaft has a straight-line mechanism.

8. The apparatus of claim 1, wherein said projection optical system comprises:

a zooming lens; and a focusing lens, wherein said projection controller shifts said zooming lens and said focusing lens so as to simultaneously performs the focusing and the zooming.

9. A method for displaying a 3-D image comprising:

projecting a series of 2-D images at different projected-positions in a depth direction, in order, by using light passing through a projection optical system;

projecting the series of 2-D images repeatedly and successively so as to cause an afterimage-effect, each 2-D image being formed on the basis of section-views of a 3-D object in the depth-direction;

adjusting a projection-timing of the series of 2-D images;

controlling the projection optical system in accordance with the projection-timing so as to focus each 2-D image and maintain a constant magnification of the series of 2-D images;

intermittently positioning a series of screens at the projected-positions in order, each 2-D image being projected on a corresponding screen, and controlling the positioning so as to synchronize positioning of the corresponding screen with the projection-timing, wherein the controlling comprises providing a camshaft that shifts a position of the projection optical system along an optical axis, in accordance with said projection-timing, and controlling the camshaft so as to synchronize with the projection-timing, and wherein intermittent positioning of the series of screens is by rotating motion, and the camshaft shifts said projection optical system while linking a rotation motion according to the intermittent positioning.

10. A 3-D display comprising:

a screen driving mechanism configured to intermittently position a series of screens at the projected-positions in order;

a projector that has a projection optical system, and projects a series of 2-D images at different projected-positions in a depth direction, in order, by using light passing through said projection optical system, each 2-D image being formed on the basis of section-views of a 3-D object in the depth-direction, said projector projecting each 2-D image on a corresponding screen; and a projection controller that adjusts a projection-timing of the series of 2-D images, and controls said projection optical system in accordance with the projection-timing so as to focus each 2-D image and maintain a constant magnification of the series of 2-D image, wherein said projector repeatedly and successively projects the series of 2-D images so as to cause an afterimage-effect, wherein said projection controller controls said screen driving mechanism so as to synchronize the positioning of the screen with the projection-timing, wherein said projector projects each 2-D image on a corresponding screen, said projection controller controlling said screen driving mechanism so as to synchronize positioning of said corresponding screen with said projection-timing.

wherein said projection controller comprises a camshaft that shifts a position of said projection optical system along an optical axis, in accordance with said projection-timing, said projection controller controlling said camshaft so as to synchronize with said projection-timing, and wherein said screen driving mechanism intermittently positions said series of screens by rotating motion, and said camshaft shifts said projection optical system while linking a rotation motion according to said screen driving mechanism.

11. An optical module for displaying a 3-D image comprising:

a projection optical system that has a focusing lens and a zooming lens, and projects a series of 2-D images that is formed on the basis of section-views of a 3-D object in a depth-direction; and a lens shifting mechanism that shifts said projection optical system in accordance with a projection-timing so as to focus each 2-D image and maintain a constant magnification of said series of 2-D images, a screen driving mechanism configured to intermittently position a series of screens at projected-positions in order, said projector projecting each 2-D image on a corresponding screen, said projection controller controlling said screen driving mechanism so as to synchronize positioning of said corresponding screen with said projection-timing, wherein a projection controller comprises a camshaft that shifts a position of said projection optical system along an optical axis, in accordance with said projection-timing, said projection controller controlling said camshaft so as to synchronize with said projection-timing, and wherein said screen driving mechanism intermittently positions said series of screens by rotating motion, and said camshaft shifts said projection optical system while linking a rotation motion according to said screen driving mechanism, wherein said lens shifting mechanism repeatedly and successively shifts said projection optical system in accordance with the projection-timing so as to simultaneously zoom and focus the series of 2-D images.

12. An apparatus for displaying a 3-D image comprising:
a projector that has a projection optical system, and projects a series of 2-D images at different projected-positions in a depth direction, in order, by using light passing through said projection optical system, each 2-D image being formed on a basis of section-views of a 3-D object in said depth-direction;
a projection controller that adjusts a projection-timing of said series of 2-D images, and controls said projection optical system in accordance with said projection-timing so as to focus each 2-D image and maintain a constant magnification of said series of 2-D images; and
a screen driving mechanism configured to intermittently position a series of screens at said projected-positions in order, said projector projecting each 2-D image on a corresponding screen, wherein said projection controller controls said screen driving mechanism so as to synchronize positioning of said corresponding screen with said projection-timing,
wherein said screen driving mechanism comprises a rotating shaft configured to extend along the depth direction, and hold said series of screens that is arranged so as to provide a predetermined interval between adjacent screens along a circumferential direction and a geneva wheel configured to intermittently rotate said rotating shaft,
wherein said projection controller comprises a camshaft that engages with said rotating shaft and shifts positions of said projection optical system along an optical axis as said rotating shaft rotates,
wherein said projector repeatedly and successively projects said series of 2-D images so as to cause an afterimage-effect.

13. An apparatus for displaying a 3-D image comprising:
a projector that has a projection optical system, and projects a series of 2-D images at different projected-positions in a depth direction, in order, by using light passing through said projection optical system, each 2-D image being formed on the basis of section-views of a 3-D object in the depth-direction;
a projection controller that adjusts a projection-timing of the series of 2-D images, and controls said projection optical system in accordance with the projection-timing so as to focus each 2-D image and maintain a constant magnification of the series of 2-D images; and
a screen driving mechanism configured to intermittently position a series of screens at said projected-positions in order, said projector projecting each 2-D image on a corresponding screen, wherein said projection controller controls said screen driving mechanism so as to synchronize positioning of said corresponding screen with said projection-timing,
wherein said screen driving mechanism comprises: a supporting member configured to hold said series of screens and have a series of engaging portions, a rotating shaft configured to extend along the depth direction, and have a series of engaging protrusions that are arranged helically in the depth direction so as to be opposite to the series of engaging portions and so as to provide a predetermined interval between adjacent engaging protrusions, circumferentially; and an urging member configured to urge each screen toward the outside of said projected-position via said supporting member, wherein said series of screens is successively and intermittently positioned at said projected-positions as said rotating shaft rotates, and
wherein said projection controller comprises a camshaft that engages said rotating shaft and shifts the position of said projection optical system along an optical axis, as said rotating shaft rotates
wherein said projector repeatedly and successively projects the series of 2-D images so as to cause an afterimage-effect.

* * * * *